Nov. 28, 1961         W. W. ADAMS ET AL         3,010,593
                  AUTOMATIC HAY BALER TRAILER
Filed Aug. 5, 1959                          6 Sheets-Sheet 1

Wayne W. Adams
Roy M. Hendricks
INVENTORS

Nov. 28, 1961  W. W. ADAMS ET AL  3,010,593
AUTOMATIC HAY BALER TRAILER
Filed Aug. 5, 1959  6 Sheets-Sheet 2
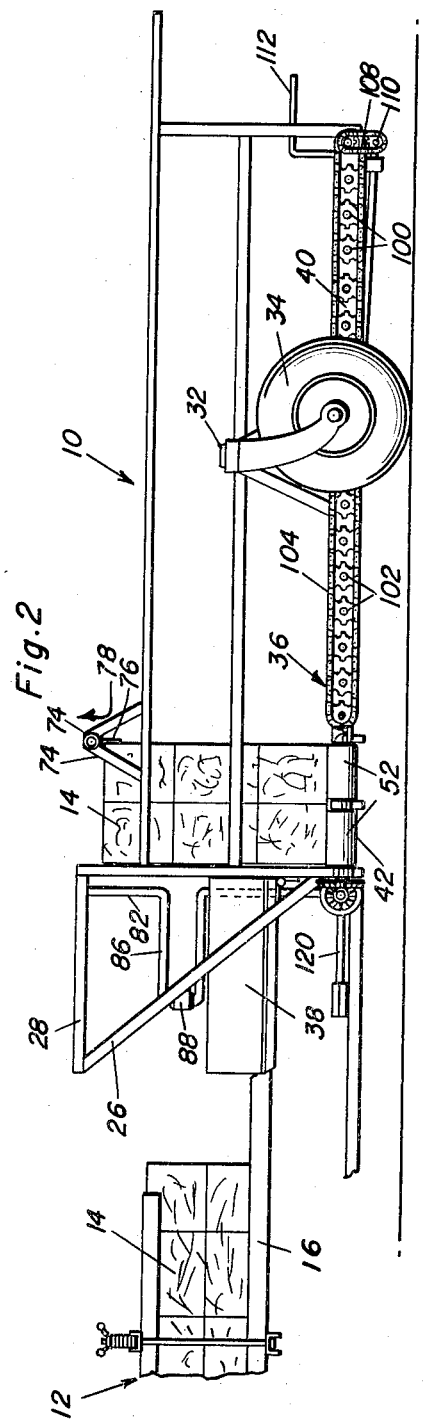
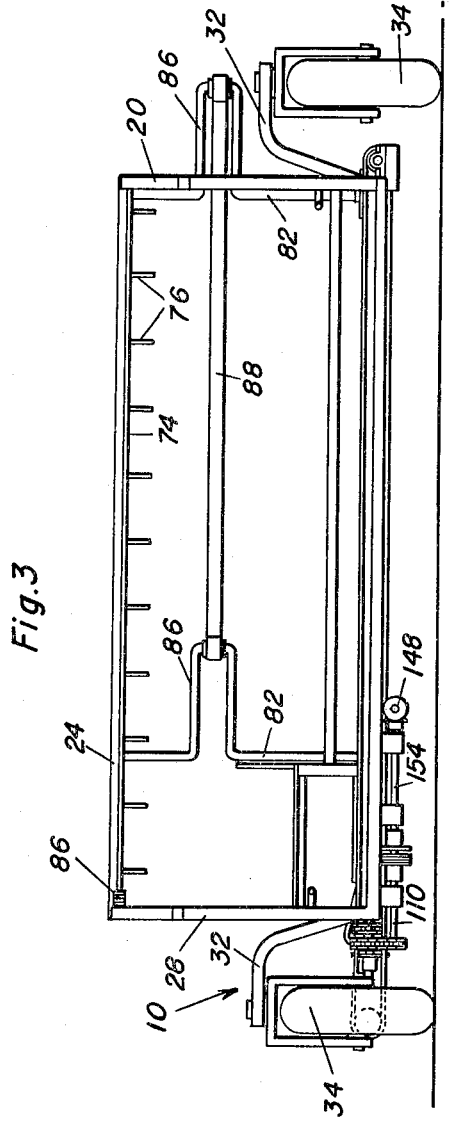
Wayne W. Adams
Roy M. Hendricks
INVENTORS

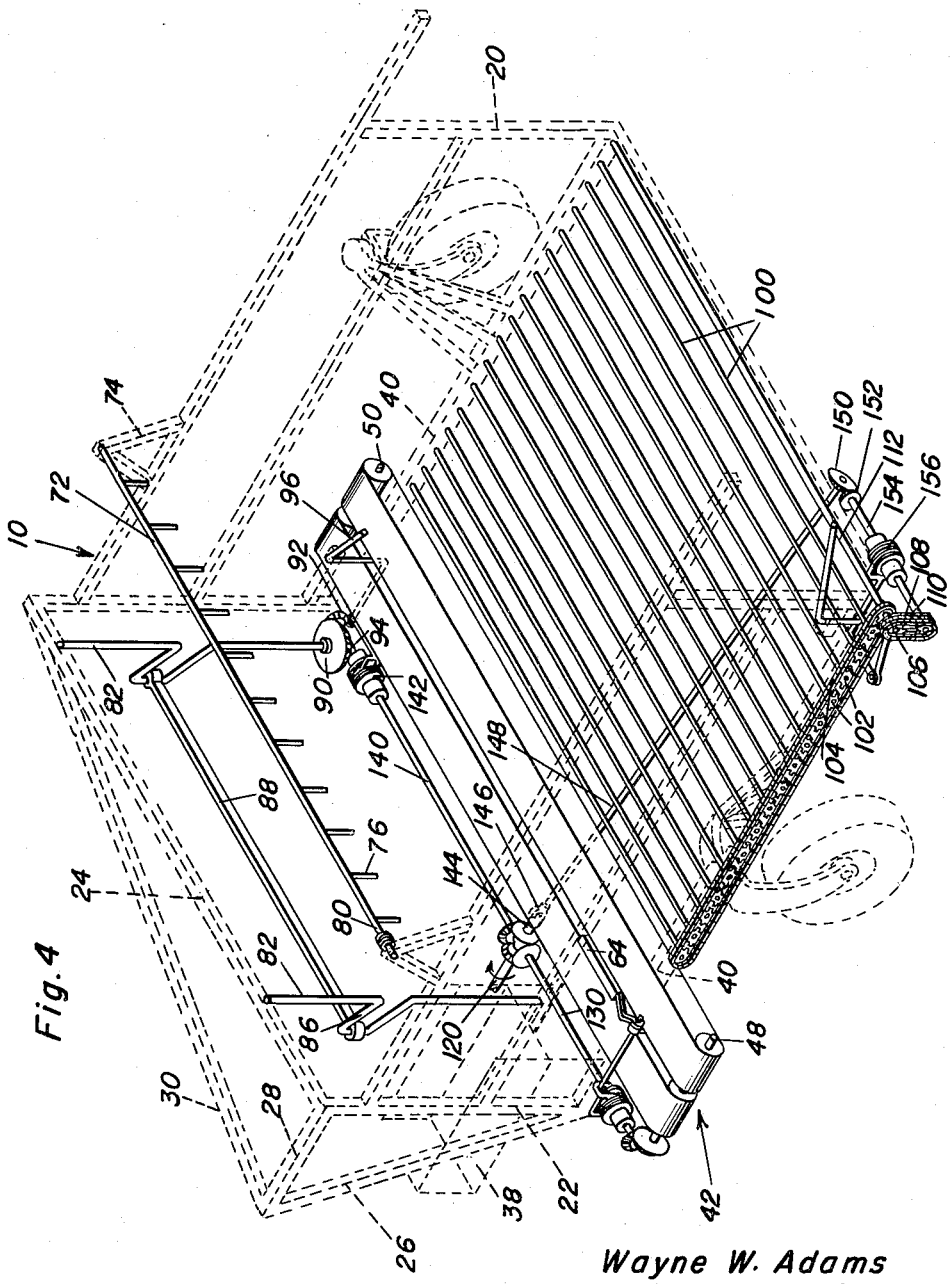

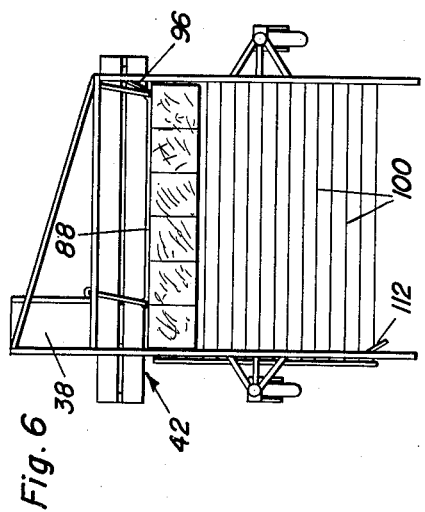
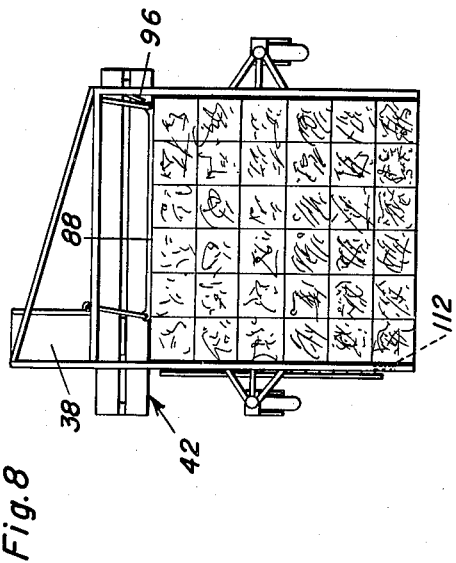
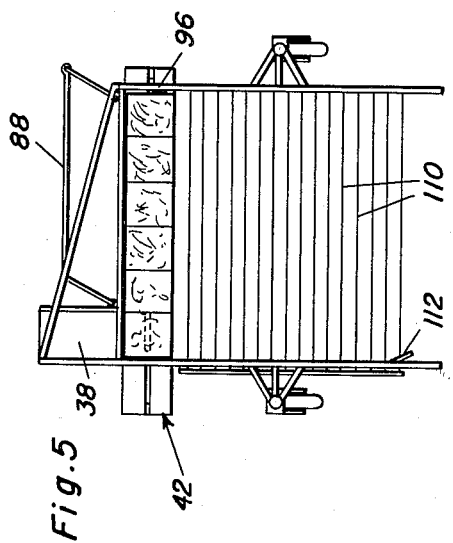
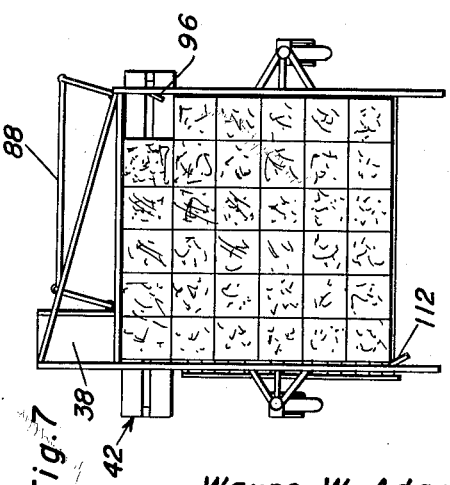
Wayne W. Adams
Roy M. Hendricks
INVENTORS

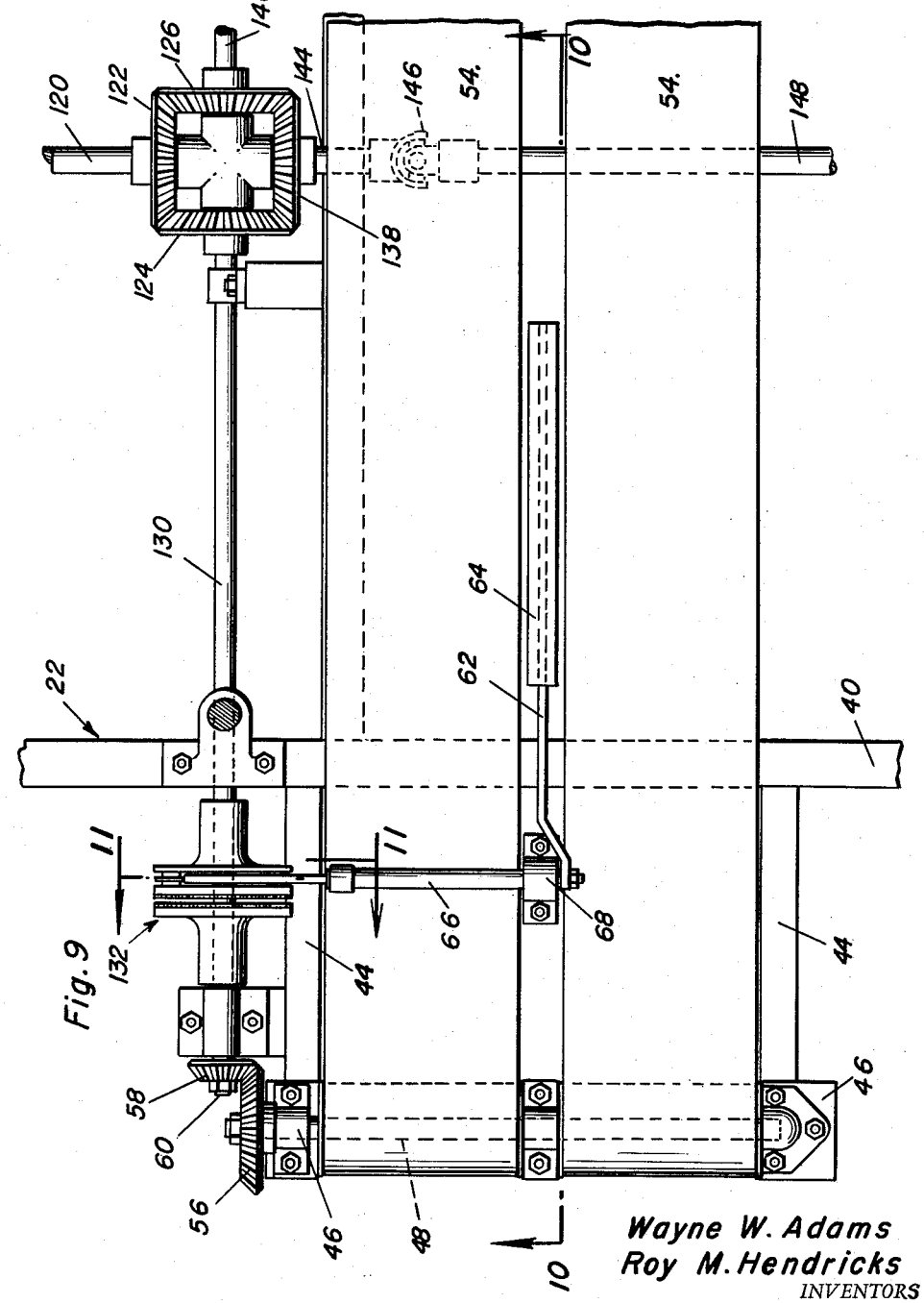

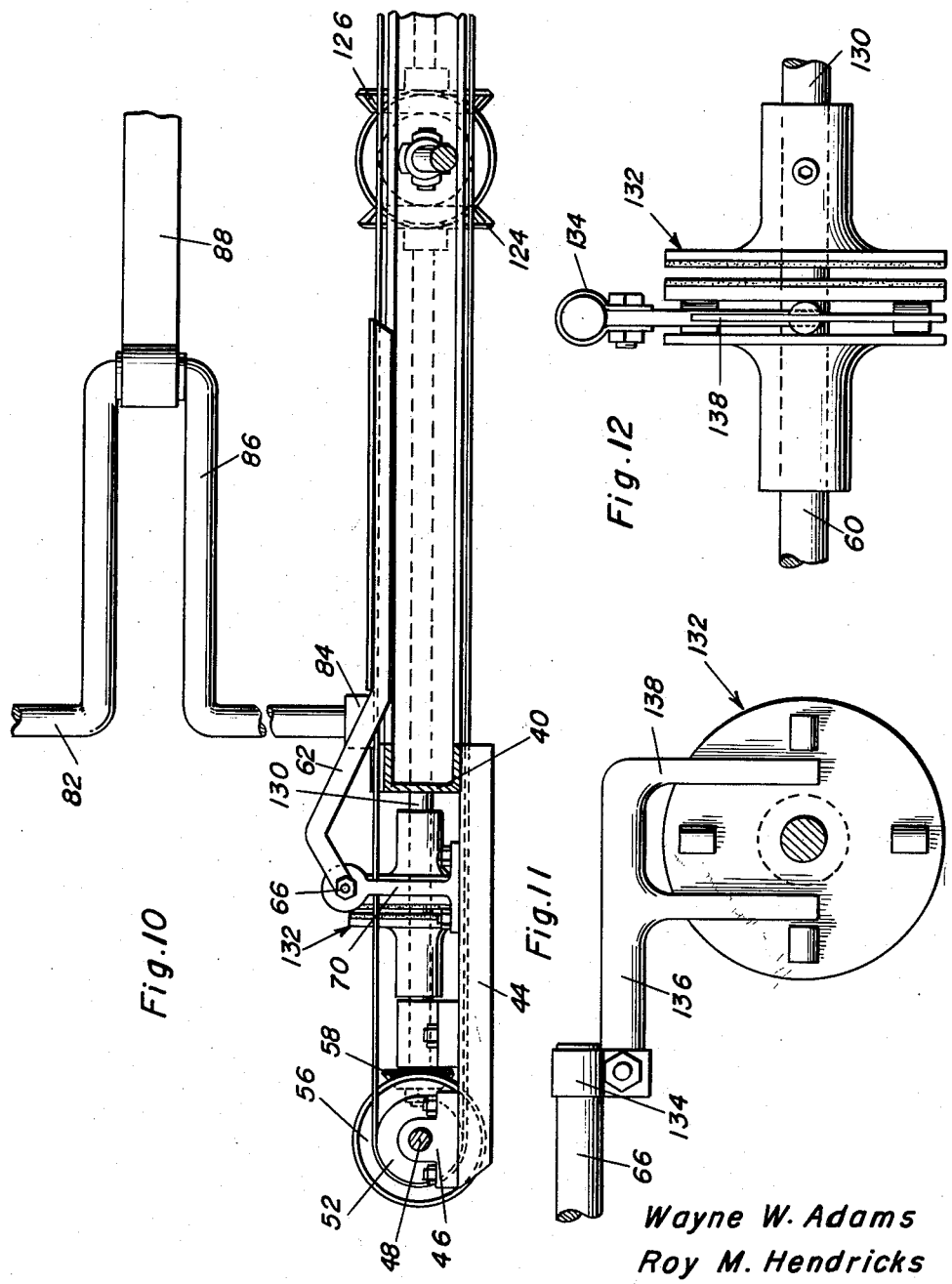

United States Patent Office 3,010,593
Patented Nov. 28, 1961

3,010,593
AUTOMATIC HAY BALER TRAILER
Wayne W. Adams, 500 N. Main, Roswell, N. Mex., and Roy M. Hendricks, Roswell, N. Mex.; said Hendricks assignor to Theo Garrison, Dexter, N. Mex.
Filed Aug. 5, 1959, Ser. No. 831,855
14 Claims. (Cl. 214—519)

This invention comprises a novel and useful automatic hay baler trailer and more particularly relates to a trailer adapted to be attached to an automatic hay baler and which shall be capable of automatically loading bales from the baler into the trailer and for automatically discharging the bales from the trailer after the latter has been completely filled thereby.

The primary object of this invention is to provide a trailer specifically adapted for attachment to an automatic hay baler and which shall be capable of effecting automatically the loading and unloading operation of the trailer without requiring the presence or attention of any attendants during its automatic operation.

A further object of the invention is to provide a trailer which shall be capable of automatically loading and unloading bales of hay and similar commodities.

A further and more specific object of the invention is to provide a trailer which shall be adapted to be attached to a conventional hay baler and to be operated by mechanism carried by a conventional tractor by which the hay baler is pulled during its operation.

A further object of the invention is to provide a trailer specifically adapted for the automatic loading and unloading of hay bales and which will completely obviate the necessity for any attendants during its operation.

A further and more specific object of the invention is to provide a hay baler trailer in which the bottom shall consist of a plurality of rollers with power driving means for the same and which shall be substituted for the usual solid bed of a trailer.

A further and important object of the invention is to provide an automatically loading trailer for hay balers wherein the feed of the bales from the baler shall automatically operate mechanism for positioning the bales in a transverse row across the trailer; together with means actuatable upon the complete filling of the first row for moving this row as a unit one row to the rear to provide space for the receiving of a new row of bales in the trailer.

A still further object of the invention is to provide an automatic operating mechanism for a trailer in accordance with the immediately preceding object which, upon the complete filling of the body of the trailer with rows of bales shall be automatically actuated to effect simultaneous movement of all of the bales in the trailer from the front to the rear and from the rear thereof.

Yet another and more specific object of the invention is to provide an automatically loading and unloading trailer which shall have a simplified mechanism for automatically effecting the loading and unloading operations thereof and which shall employ three conventional clutches for controlling the power supply to the mechanism throughout its automatic operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a side elevational view of the left side of the trailer of FIGURE 1 and showing the manner in which the trailer is associated with the discharge end of an automatic baler for coaction therewith;

FIGURE 3 is a rear elevational view of the trailer of FIGURES 1 and 2 and showing a particular disposition of the means for automatically moving the first complete transverse row of bales rearwardly in the body of the trailer to make room for the forming of the next transverse row of bales;

FIGURE 4 is a view partly in perspective and partly diagrammatic of the operating mechanism of the invention, certain parts of the trailer being removed and shown in dotted lines therein;

FIGURES 5-8 are top plan views, diagrammatic in nature, which illustrate successive steps in the automatic loading operation of the trailer;

FIGURE 9 is a detail view of a portion of the operating mechanism of the trailer;

FIGURE 10 is a vertical sectional detail view taken substantially upon the plane indicated by the section line 10—10 of FIGURE 9;

FIGURE 11 is a further detail view in vertical section taken substantially upon a plane indicated by the section line 11—11 of FIGURE 10; and FIGURE 12 is a detail view of a portion of the mechanism of the invention.

Figure 1:
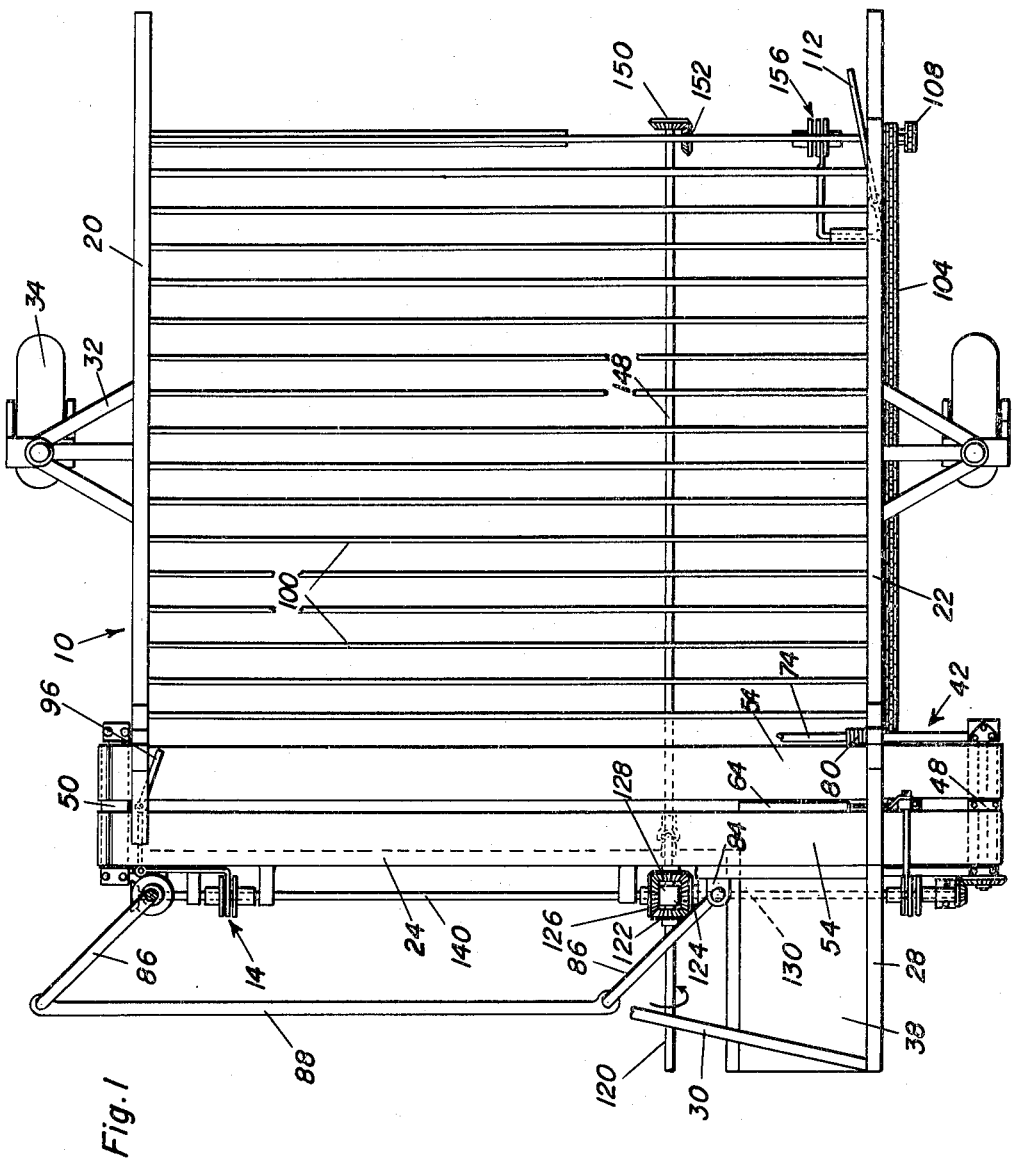
FIGURE 1 is a top plan view of a preferred embodiment of an automatic trailer in accordance with the present invention.

Referring first to FIGURES 1-4, it will be observed that the automatic loading and unloading trailer in accordance with this invention is designated generally by the numeral 10 and as shown in FIGURE 2 is adapted to be coupled in any desired manner to the rearward end of an automatic hay baler, the rearward portion of which is designated generally by the numeral 12, it being understood that this hay baler may be of any suitable type by means of which bales of hay as shown at 14 are discharged rearwardly from a discharge chute 16 forming a part of the hay baler. It will be understood that the hay baler is itself coupled to a tractor vehicle, not shown, by which the hayer baler is powered and by means of which power is applied to drive the various mechanisms forming a part of the automatic trailer 10. It will be further realized that in operation the tractor draws the hay baler through a field while the latter tows the trailer behind the same, the baler automatically and continuously forming the hay into bales 14 and discharging these bales into the trailer 10 during the travel of the combined apparatuses through a field whose crop is to be baled by this invention.

The trailer 10 consists of a moble frame comprising a body having a pair of side walls as at 20, 22, which may consist of any suitable open framing, together with an open front and an open rear. The two side walls 20 and 22 are joined at the front as by a transverse horizontal frame member 24 having suitable supporting bracing as at 26, 28 and 30 secured thereto, see in particular FIGURE 4. The usual bed comprising the bottom of a trailer is replaced in the present instance by a construction to be subsequently set forth.

Projecting from the side walls 20 and 22 of the body are suitable support means as at 32 upon which are mounted supporting caster wheels 34 by which the body is supported and readily manuevered.

It will be observed especially from FIGURE 2 that the bottom 36 of the trailer body is disposed at a lower elevation than that of the discharge chute 16 of the baler 12, and that from the forward end of the trailer body there extends an inlet chute 38, see also FIGURES 1 and 4, whose bottom wall is disposed at the same horizontal level as that of the discharge chute 16 and which is positioned in alignment therewith whereby a bale 14 fed along the discharge 16 will in turn be forced by the bales behind the same into the inlet chute 38 and thus into the body of the trailer.

The arrangement is such that as the bale passes into the inlet chute 38, it will drop from the inward or rearward end of the same and downwardly upon the bottom 36, so that the bale will stand upon its end as shown in FIGURE 2. Since the inlet chute 38 is disposed immediately adjacent one side wall of the trailer body, as for example against the side wall 22 thereof, it will stand in the forward left hand corner of the body as viewed in FIGURES 1 and 3 and as shown in the diagrammatic views of FIGURES 5 and 7.

In addition to the hereinbefore described general construction and arrangement of the trailer and its association with the hay baler, the trailer includes a number of subcombinations or components by which automatic loading and unloading operations are performed. These include a transverse feed means by which the bales introduced singly at the left forward end of the body are moved step-by-step transversely across the front portion of the body until there is secured a filled front transverse row of bales standing on end therein; a longitudinal feed means operable to move each completely filled front transverse row of bales rearwardly of the body to provide room for the next front row to be formed until the entire body has been filled by this step-by-step rearward motion of the transverse rows as units towards the rear; a discharge means operable when the body has been completely filled, to automatically move all of the bales to the rear of the body and discharge the bales therefrom; together with a drive means which imparts operation to each of the foregoing means, and which includes control means rendering each of the foregoing means selectively operable in properly timed relation to the over-all cyclic operation of the device. The construction, arrangement and the operation of the above-mentioned four component mechanisms of the complete apparatus will now be described in detail in the foregoing order.

Transverse feed means

The lower side walls 20 and 22 include a pair of longitudinally extending channel members each indicated by the numeral 40, see also FIGURES 4, 9 and 10, and which serve as set forth hereinafter to support the novel bottom construction 36 of the trailer body. The transverse feed means, designated generally by the numeral 42, comprises the forward or front portion of this bottom 36 and is disposed immediately adjacent the open front of the body. This transverse feed means includes a transversely extending conveyor which serves to support the successive bales 14 discharged thereonto by the inlet chute 38 and to transport these bales in a step-by-step motion transversely across the front portion of the body of the trailer from the side wall 22 to the side wall 20 thereof until there is formed a completely filled front transverse row of bales as shown in FIGURES 5 and 6.

This conveyor, as will be best understood by reference to FIGURE 9, includes laterally projecting support brackets 44 which project outwardly from the sides of the two side walls 20 and 22 and from the channel members 40 thereof. Journaled in suitable journal bearings as at 46 carried by the outer ends of the brackets 44 are a pair of axles 48 for the side wall 22 and 50 for the side wall 20, these axles in turn having rollers or drums 52 secured thereon over which a pair of spaced belts each designated by the numeral 54 are entrained. The top surfaces of these belts form a supporting surface upon which the bales 14 rest and by which the bales are transported across the body of the trailer as above set forth. Obviously any suitable structural members may be disposed beneath the upper flights of the belts 54 and upon which these upper flights slide, in order to support the weights of the bales as the latter are supported by and transported across the bottom of the trailer body.

One of the axles, as for example the axle 48, is utilized to impart controlled travel or movement to the belts 54 in a manner to be subsequently set forth. For that purpose, as shown best in FIGURE 9, a driven gear 56 is fixedly secured to the forward end of the axle 48 and is continuously in mesh with a driving gear 58 which in turn is fixedly secured to a shaft 60 which forms part of a connecting means by which the transverse feed means is operatively connected to a driving means which in turn is connected to a source of power all as set forth hereinafter.

In order to control the application of power to the axle 48 for imparting movement to the conveyor belts 54, there is provided a control means which includes a lever 62 having a paddle or pedal 64 by which the lever is actuated, the lever being secured in turn to a shaft 66 having suitable journals 68 by which the shaft is secured to a structural member 70, see FIGURE 10, carried by the previously mentioned brackets 44 of the body, the shaft 66 in turn being operatively connected to the connecting means by which the gearing 58 and 56 is operated, in a manner to be subsequently described. However, it may be here noted that the position of the actuator lever 62 is such that this lever is positioned between the two belts 54 and adjacent the left end of the same and rises above the surface of the top flight of the belts so that when a bale is dropped from the inlet chute 38 upon the left end of the conveyor, it will rest upon and depress the actuator 62 and thus place in operation the connecting means and cause travel of the belts 54 to thereby move the bale resting thereon towards the right or towards the side 20 of the body. The actuator is so placed that movement of the conveyor will be continued until the bale has moved a sufficient distance to the right to release the actuator 64 thereby deenergizing the driving means for the conveyor, this being effected after a sufficient space is provided to receive the next bale discharged into the body by the inlet chute 38.

It will be understood that any desired means, not shown, may be provided for returning the actuator 62 to its raised inoperative position in readiness for actuation by being depressed by the next bale being dropped thereon.

In order to maintain the bales in transverse alignment as they are moved with a step-by-step motion across the front end of the body to form the completely filled first transverse row of bales, there is provided a transversely extending guide bar 72 carried by suitable support brackets 74 mounted upon and rising from the top edges of the side walls 20 and 22. Fingers as at 76 may depend from this guide bar and are so positioned as to engage the upper portion of the rearward surface of the row of bales, as shown in FIGURE 2, and prevent their rearward movement until such time as an arcuate swinging movement is given to the guide bar 74 in the direction indicated by the arrow 78 in FIGURE 2, when the entire front transverse row of the bales is moved or shifted one row rearwardly of the body by means to be subsequently set forth. Preferably a spring means such as indicated by the springs 80, see FIGURES 1 and 4, are secured to the guide bar 72 to yieldingly retain the same in the position with the fingers depending vertically therebeneath but which will permit the above mentioned swinging movement of the guide bar.

Although it has not been deemed necessary to illustrate the same, it is of course possible to provide a stationary guide extending across the front end of the body and adjacent the bottom 36 whereby to prevent any tendency of the bales to shift forwardly beyond the front end of the body.

Longitudinal feed means

In order to effect the abovementioned rearward travel of the entire front transverse row of bales which are supported by the conveyor 42, there is provided an automatically operable longitudinal feed means. Although various mechanisms could be provided for this purpose, a very satisfactory arrangement as illustrated in these drawings consists of a pair of vertically disposed parallel crankshafts each designated by the numeral 82 and which are spaced inwardly from the two side walls and forwardly of the open front of the body. For this purpose, the crankshafts are supported by suitable brackets 84, the crankshafts having cranks 86 thereon which are disposed in parallel relation. The throw of these cranks is at least equal to the width of a bale, that is, to the distance by which the front transverse row of bales is to be displaced rearwardly of the body in order to provide room for forming the next front transverse row. The presser means further includes a presser bar 88 whose opposite ends are journaled upon the crank throws as clearly shown in FIGURES 1 and 4.

At the lower end of one of the crankshafts there is provided a driving means in the form of gearing, the same including a driven bevel gear as at 90 which in turn is connected to a driving gear 92 carried by an axle or shaft 94 which is likewise suitably journaled upon the lower portion of the framework of the body. A suitable connecting means to be hereinafter described imparts power to the shaft 94 from a drive means, and through the connection of the presser bar 88 causes both of the crankshafts to rotate in unison. This in turn causes the presser bar to move in a circular path so that upon the rearward portion of its movement the presser bar will engage the front transverse row of bales at about the mid-portion thereof, and will press these bales backwardly and move them from the conveyor 42 onto the rearward portion of the body 36.

In order to control the connecting means by which power is applied to the longitudinal feed means, there is provided an actuator in the form of an actuator lever 96 which is suitably journaled upon the body and is disposed above the right hand end of the conveyor means and adjacent the side wall 20, in such a position as shown in FIGURE 1 as well as in FIGURES 6-8 than when the front transverse row of bales has been completely filled, the bale on the right end thereof will press against and depress this actuator and thus initiate operation of the driving mechanism by which the presser means of the longitudinal feed means will be caused to make one rotation and thus move the forward transverse row of bales rearwardly to the position of the second transverse row of bales. As soon as the bales have been displaced from the position shown in FIGURE 5 to that shown in FIGURE 6, the actuator 96 will be released and will be returned by any suitable means, not shown, to its original position in readiness for the next operation, thereby discontinuing operation of the longitudinal feed means.

It will thus be understood that there is a successive intermittent operation of the longitudinal feed means through the actuator 96 to produce a step-by-step rearward pushing of successively filled front rows of bales until the trailer body is completely filled thereby as will be understood from a comparison of FIGURES 5 and 6 with FIGURES 7 and 8.

Discharge means

After the body of the trailer has been completely filled with bales as shown in FIGURE 8, a discharge means is automatically rendered operative for effecting a complete emptying of the body of the trailer and the discharge of all of the bales therein. For a consideration of this discharge means reference is now made especially to FIGURES 1, 2 and 4.

The discharge means includes a plurality of rollers 100 which are journaled in the previously mentioned channel members 40 of the body and extend transversely thereof. These rollers also constitute the rearward portion of the floor 36 and provide an open floor in contrast with the usual bed which comprises the customary bottom of trailers. Each of the rods or rollers 100 is journaled for rotation and is provided at one end with a gear as at 102 about which is entrained a chain 104 comprising a connecting means by which all of the rollers are connected together for simultaneous rotation. Secured to one of the rollers or rods 100 is a further gear 106 which in turn is connected as by a chain 108 with a drive shaft 110, and the latter through a connecting means to be subsequently described is connected to a source of power by means of a drive shaft whereby rotation may be imparted to the series of rollers. It will now be apparent that the rollers provide a construction which will facilitate the rearward travel of successive transverse rows of bales under the action of the presser bar 88 previously described until the trailer body is filled with the bales; and upon rotation being imparted to the rollers, all of the bales supported thereby will also be discharged rearwardly from the open rear end of the trailer upon the ground, from whence they may be collected in a suitable manner which forms no part of the present invention.

In order to automatically initiate operation of the discharge means as soon as the body has been filled with bales there is provided an actuator including an actuating lever 112 which is suitably journaled in the body for rotation about a vertical axis and which actuator is positioned at the rearward portion of the trailer body and adjacent one side wall thereof in such a manner as to be depressed by the pressure of a bale in the rearmost transverse row of bales when this last mentioned row is moved to the extreme rear of the trailer body. It will be observed that the rotation of the discharge rollers 100 will continue until the last row of bales, that is the first of the row of bales releases the actuator 112 whereupon the latter will return to its original position by any suitable return means, not shown, and discontinue further operation of the discharging mechanism.

Operating mechanism for the feed means

As previously mentioned, power for operating the above described components of the automatic mechanism of the trailer is obtained from the tractor vehicle by which the trailer is towed. For the purpose of this invention it is not deemed necessary to disclose the precise nature of the connection of the mechanism to the ultimate source of power. It is sufficient to indicate a power input shaft as at 120 which is journaled upon and projects forwardly from the front end of the trailer and is adapted to be connected in any suitable manner to the source of power upon the tractor vehicle. This shaft has a main driving gear 122 which directly engages a pair of driving gears 124 and 126, the two latter gears in turn being connected to a further driven gear 128. The gear 124 serves to transmit power from the power input shaft 120 to the transverse feed means; the gear 126 transmits power to the longitudinal feed means; while the gear 128 transmits power to the discharge means.

Referring now primarily to FIGURES 9-12, it will be seen that the gear 124 is fixedly secured to the transverse feed means drive shaft 130 which is suitably journaled upon the frame of the trailer body. The previously mentioned connecting means by which power is transmitted to the shaft 60 consists of a clutch assembly 132 which is connected to these two shafts which are in aligned position as shown in FIGURE 9. The clutch assembly 132 is of any conventional design and since the details of construction of the clutch itself form no part of the invention claimed herein, they are omitted as being superfluous. It is sufficient to note that the previously mentioned shaft 66 which is rocked by the actuator 62 has secured thereto as by a clamp 134 the arm 136 of a clutch actuating fork or yoke 138. The arrangement is such that as viewed in FIGURE 10, when the actuator 62 is depressed, the fork 138 will engage the clutch whereby rotation of the shaft 120 will effect operation of the conveyor 42 and thus cause operation of the transverse feed means.

In a similar manner it will be observed that the gear 126 is fixedly secured to a shaft 140 and the latter in turn is connected to a clutch 142 which is controlled by the actuator 96. Since the details of this clutch and the connection of the actuator 96 thereto form no part of the invention claimed hereinafter, a further description has been omitted as unnecessary. However, the arrangement is such that when the actuator lever 96 is depressed by pressing of the endmost bale thereagainst as the bales of the front row are moved towards the side wall 20, the clutch 142 will be engaged thus imparting rotation to the crank shafts 82 and causing the rotation of the presser bar 88. This actuation will be discontinued when the presser bar has pushed the complete first row of bales from the conveyor 42 onto the rollers 100 and such movement has disengaged the bales from contact with the actuator 96 permitting the latter to return to its inoperative position.

In much the same manner, the gear 128 is fixedly secured to a shaft 144, which in turn is connected by universal joint 146 to the longitudinally and rearwardly extending shaft 148 having a gear 150 secured to its rearward end. The gear 150 in turn is engaged with a gear 152 carried by a transverse shaft 154. A clutch assembly 156 connects the aligned shafts 110 and 154 and is controlled through the actuator 112 previously described. The arrangement is such that as long as the actuator 112 is depressed by engagement of a bale therewith, power will be supplied from the input shaft 120 through the gearing 122, 124, 126 and 128, and then through the shafts 144 and 148 to the connecting means by which the gear 150 is connected to the rollers 100. When the actuator 112 is released by passage of the bales from the open rear end of the body of the trailer, the operation of the discharge means will in turn be discontinued.

During the operation of the trailer it is intended that the input shaft 120 shall be continuously rotated at all times. However, although the shafts 120 and therefore 130, 140 and 144 are in constant rotation, the transverse feed means, the longitudinal feed means and the discharge means are only intermittently placed in operative engagement therewith. It will thus be seen that these three means for shifting and moving the bales are actuated solely by the bales themselves which are successively fed into the trailer body from the discharge chute 16 of the baler and the inlet chute 38 of the trailer. There is thus a cyclic operation as follows.

Referring now to FIGURES 5–8 it will be understood as the bales 14 are successively delivered into the front end of the trailer body and dropped upon the conveyor 42 which constitutes the front portion of the bottom of the trailer, each successive bale will depress the actuator 62 and thus cause travel of the conveyor to shift this bale towards the right and off of the actuator lever or pedal. This intermittent operation will continue until the first row of bales has been completely filled as shown in FIGURE 5, and as the last bale is dropped upon the actuator 62, thus completely filling the first transverse row of bales, the attempt of the conveyor to move the row of six bales shown in FIGURE 5 towards the right will depress the actuator 96 and initiate operation of the presser means. As shown in FIGURE 6 this operation has caused the presser bar 88 to move the first transverse row of bales off of the conveyor and upon the forward end of the rollers 100. As soon as the first row of bales has been shifted to the position shown in FIGURE 6, the acuator 96 will be released thus discontinuing the travel of the conveyor. Thereupon the continued successive feeding of bales through the inlet chute 38 will repeat this operation until the first row is again filled with bales. The successive travel of filled transverse rows of bales rearwardly from the position shown in FIGURE 6 continues until as shown in FIGURE 7 the rearmost row of bales is ready to engage and depress the actuator 112 while the right end bale of the first transverse row of bales is ready to be moved against the actuator 96. This is the position shown in FIGURE 7. From the position in FIGURE 7, the last introduced bale operates the actuator 62 and moves the five bales then standing in this first row towards the right and a sixth bale in turn drops into place. When the sixth bale falls, it in turn causes the actuator 62 to again attempt to move the first transverse row of six bales towards the right thus depressing the actuator 96 and initiating operation of the presser means. This moves the sixth transverse rows of bales as a unit towards the rear and causes the end bale of the rearward row to in turn actuate the actuator 112 and thus initiate operation of the discharge means. This operation moves the entire mass of bales by rotation of the rollers 100 rearwardly of and out of the open rear end of the trailer. As the last row of bales leaves the trailer, this being the first transverse row of bales, the actuator 112 will be released thus discontinuing operation of the discharge means and the trailer is now in readiness for a resumption of the loading of the same.

It will be observed that an important advantage of this invention is that the loading and unloading operations of the trailer are entirely automatic, are effected in a step-by-step manner, and result in the body of the trailer being completely filled with bales at the time of the discharge of the bales therefrom in a single group. Thus, the usual two attendants or workers customarily required to load and unload the trailer are completely eliminated and the automatic operation of the device can be initiated or terminated by merely controlling the power take-off of the tractor by which rotation is imparted to the drive means and to the input shaft 130 thereof.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. An automatic trailer adapted to be attached to the discharge end of a hay baler comprising a body having a bottom, side walls and a front and rear, transverse feed means in the front end of said body operable upon the deposit of bales upon one end of said means to feed bales intermittently in a step-by-step motion whereby to fill the body with a first transverse row of bales, longitudinal feed means in said body operable intermittently each time the first traverse row of bales is filled to transfer said first row as a unit towards the rear a distance sufficient to provide space in which to form a new first row whereby to fill the entire body with longitudinally spaced transverse rows of bales, discharge means in said body operable when the entire body is filled with bales to move all the transverse rows of bales simultaneously to and through the rear of said body.

2. The combination of claim 1 including a drive means connected to a source of power, means connecting each of said transverse feed means, said longitudinal feed means and said discharge means to said drive means for actuation thereby.

3. The combination of claim 2 wherein each of said connecting means includes a clutch, an actuator for each clutch for controlling the actuation thereof, each actuator being positioned for actuation by the pressure of a bale thereagainst.

4. The combination of claim 1 wherein said transverse feed means includes a conveyor on the bottom of said body adjacent the front thereof and of a width sufficient to receive a bale when disposed on end and of a length extending transversely across said body between said side walls.

5. The combination of claim 4 wherein said transverse feed means includes an actuator disposed upon said conveyor at one end thereof and positioned for actuation by the weight of a bale when deposited upon said one end from said hay baler, drive means connected to a source of power and to said conveyor and controlled by said actuator for effecting movement of said conveyor to shift the bale deposited upon said one end transversely of the body and toward the other end of said conveyor while said actuator is depressed by said bale deposited thereon.

6. The combination of claim 1 wherein said longitudinal feed means includes presser means mounted at the front end of said body and includes a bar movable longitudinally of said body for pushing a front transverse row of bales rearwardly in said body a distance sufficient to receive a new front row of bales.

7. The combination of claim 6 including an actuator positioned for engagement by the first bale deposited on said transverse feed means when the first bale has been moved transversely across said body to the other side thereof, drive means connected to a source of power and to said presser means and controlled by said actuator for effecting movement of said presser means to shift the first transverse row of bales rearwardly as a unit while said actuator is depressed by said first bale.

8. The combination of claim 1 wherein said discharge means includes a plurality of transversely disposed rollers journaled in said body and forming the rearward portion of said bottom.

9. The combination of claim 8 including an actuator, positioned in said body for engagement and depression by a bale of the rearmost of a transverse row of bales when the latter reaches the rear of said body, a drive means connected to a source of power and to said rollers and controlled by said actuator for effecting rotation of said rollers when depressed by a bale whereby to transport all of said bales rearwardly of and from said body.

10. The combination of claim 1 wherein said transverse feed means includes a conveyor on the bottom of said body adjacent the front thereof and of a width sufficient to receive a bale when disposed on end and of a length extending transversely across said body between said side walls, said conveyor comprising a pair of endless belts journaled for rotation upon parallel horizontal rollers secured at opposite sides of said body, said belts comprising the forward portion of said bottom.

11. The combination of claim 1 wherein said longitudinal feed means includes presser means mounted at the front end of said body and includes a bar movable longitudinally of said body for pushing a front transverse row of bales rearwardly in said body a distance sufficient to receive a new front row of bales, said presser means comprising a pair of vertical crank axles journaled in said body at the front end thereof, a presser member having its ends journaled on a crank of each axle and positioned for engaging a transverse front row of bales midway of the height of the latter, said cranks having a throw at least equal to the distance through which said first row of bales is to be moved rearwardly of said body.

12. The combination of claim 1 wherein said discharge means includes a plurality of transversely disposed rollers journaled in said body and forming the rearward portion of said bottom, means secured to each of said rollers and connecting them for simultaneous movement.

13. The combination of claim 12 including an actuator, positioned in said body for engagement and depression by a bale of the rearmost of a transverse row of bales when the latter reaches the rear of said body, a drive means connected to a source of power and to said rollers and controlled by said actuator for effecting rotation of said rollers when depressed by a bale whereby to transport all of said bales rearwardly of and from said body.

14. The combination of claim 13, said means being drivingly connected to one of said rollers.

References Cited in the file of this patent
UNITED STATES PATENTS

| | | |
|---|---|---|
| 1,117,433 | Owens | Nov. 17, 1914 |
| 2,556,082 | Hartness | June 5, 1951 |